Patented May 26, 1925.

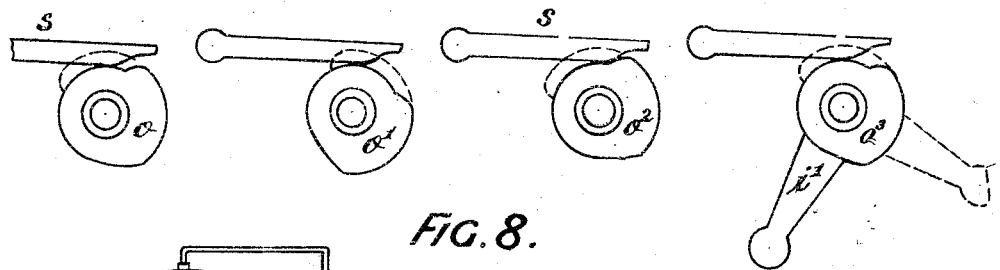
FIG. 8.
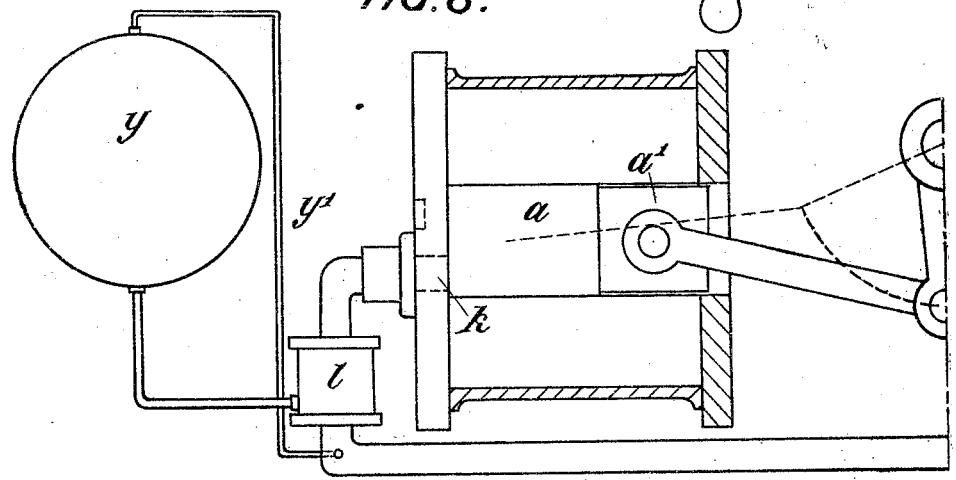
FIG. 1.
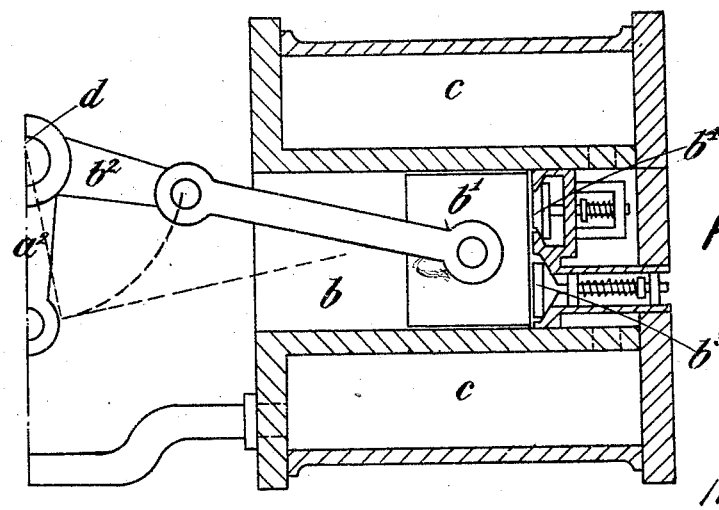
FIG. 1ª

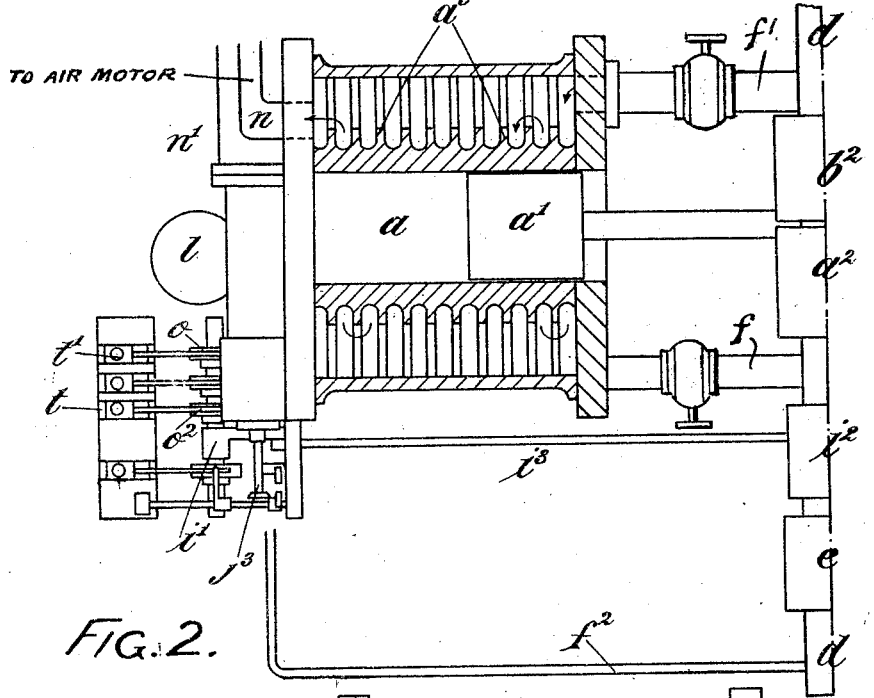

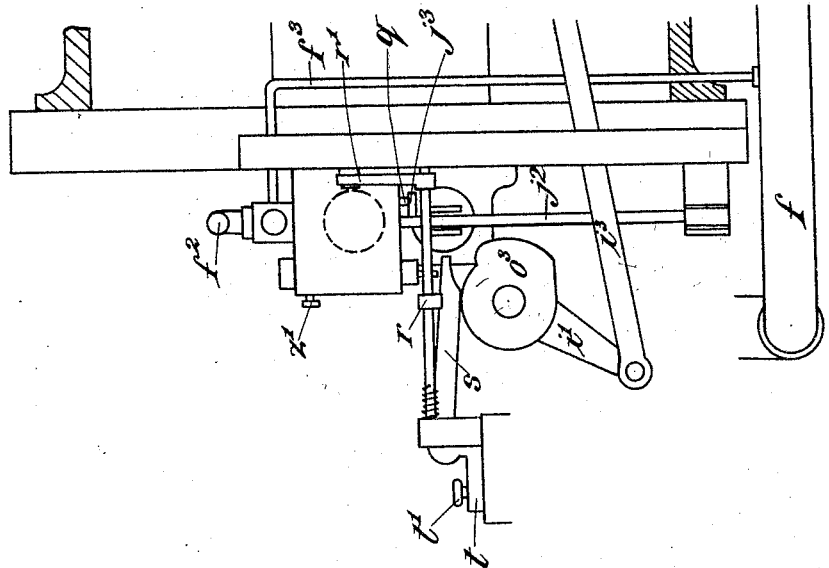
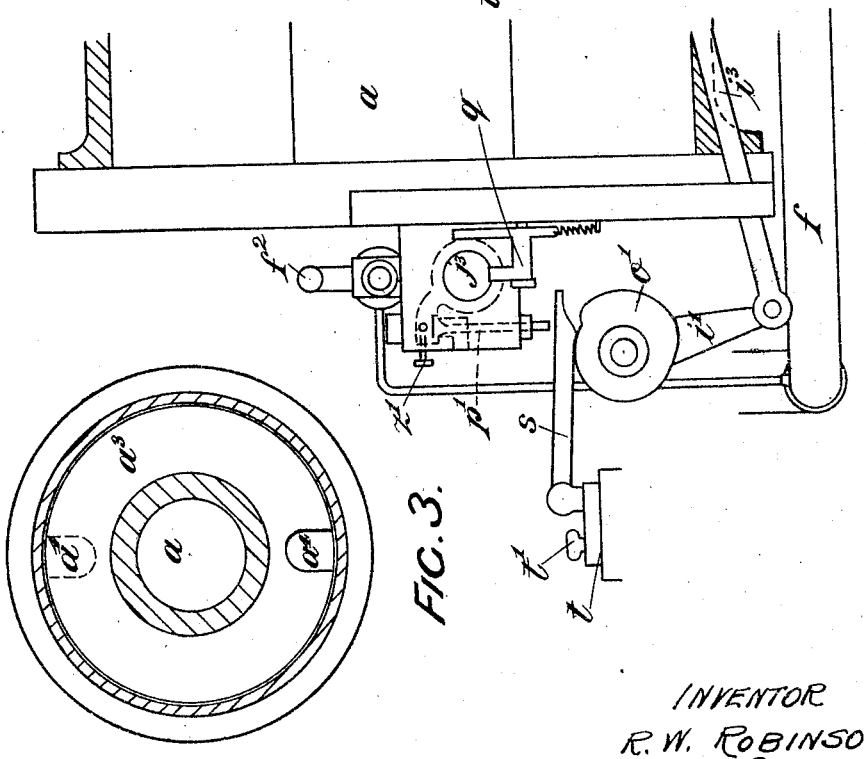

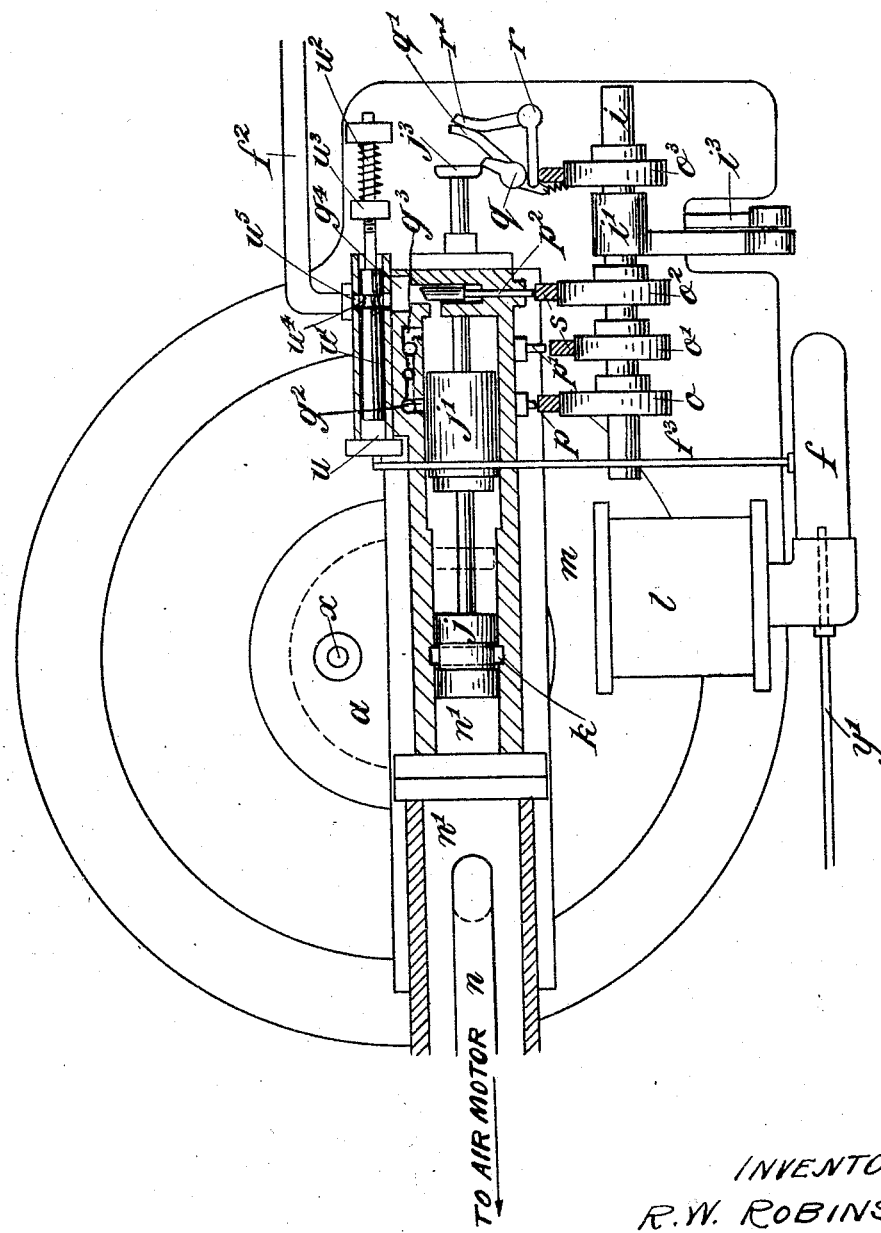

1,539,024

UNITED STATES PATENT OFFICE.

ROCHFORT WYBRANTS ROBINSON, OF MARLOW, ENGLAND.

COMBINED INTERNAL-COMBUSTION AND COMPRESSED-AIR ENGINE.

Application filed September 27, 1920. Serial No. 413,129.

(GRANTED UNDER THE PROVISIONS OF THE ACT OF MARCH 3, 1921, 41 STAT. L., 1313.)

*To all whom it may concern:*

Be it known that I, ROCHFORT WYBRANTS ROBINSON, a subject of the King of Great Britain and Ireland, and a resident of Marlow, Buckinghamshire, England, have invented a certain new and useful Improvement in Combined Internal-Combustion and Compressed-Air Engines, for which I have filed application in England June 17, 1919, Patent No. 15,202, and of which the following is a specification.

This invention relates to a new or improved internal combustion engine (hereinafter termed "the engine") designed to work in combination with an air compressor, compressed air reservoirs, and a compressed air motor (hereinafter termed the "air motor") wherein the engine generates energy from fuel and stores it in the form of compressed air in the reservoirs to drive machines in the known manner; the combination according to this invention is characterized by interconnecting the engine and the air motor, without moving gear, but with compressed air in such a way that the working of the engine is controlled by the pressure of the air in the reservoirs, so that the rate at which the engine generates energy is automatically controlled by the rate at which the energy is used by the air motor; by the stroke of the combustion cylinder piston always taking place at the same speed and with the same amount of charge and the same timing of ignition, delivering the same amount of power whatever may be the speed of the working shaft of the air motor or whatever the power being delivered by it, the speed of the stroke of the combustion cylinder piston and the time interval between each stroke being independent of one another; by the resistance opposed by the air in the compressor to the stroke of the piston of the combustion cylinder diminishing during the latter part of the stroke in proportion to the fall of the pressure of the expanding gases so that these gases will still produce power up to a point when their pressure is quite low; and by each stroke of the combustion cylinder piston taking place at its maximum speed immediately on the explosion of the charge, so that the heat generated will be converted into power before much of it has time to pass into the cylinder walls.

Other objects in addition to the foregoing general object is to obtain increased power from the internal combustion unit of the apparatus by utilizing the full expansion of the heated gases in the combustion cylinder and avoiding the use of gearing while at the same time employing means to control the mixture of the fuel and the timing of the ignition to the best advantage in such a way that the speed at which the power is generated in the engine is automatically controlled by the speed at which it is used in the air motor.

With the above and other objects in view which will more readily appear as the nature of the invention is better understood, the same consists in the novel construction, combination and arrangement of parts, hereinafter more fully described, illustrated and claimed.

A preferred and practical embodiment of the invention is shown in the accompanying drawings in which—

Figs. 1 and 1ª are complemental longitudinal sectional views respectively showing opposite ends of the engine, said section being taken through the combustion chamber and the air compressing chamber.

Figs. 2 and 2ª are complemental horizontal sectional views of the construction shown in Fig. 1.

Figure 3 is a vertical cross-sectional view of the combustion cylinder and its surrounding jacket taken through one of the radiating fins.

Figure 5 is a detail side elevation of the construction shown in Figure 4.

Figures 6 and 7 are respectively front and side elevations of an alternative form of means for accomplishing the same result as the construction shown in Figures 4 and 5.

Figure 8 is a diagrammatic view illustrating the relative positions of the control cams in full and dotted lines when actuated by the main rocking shaft of the device.

The same letters in all the figures represent the same parts.

Figure 4:
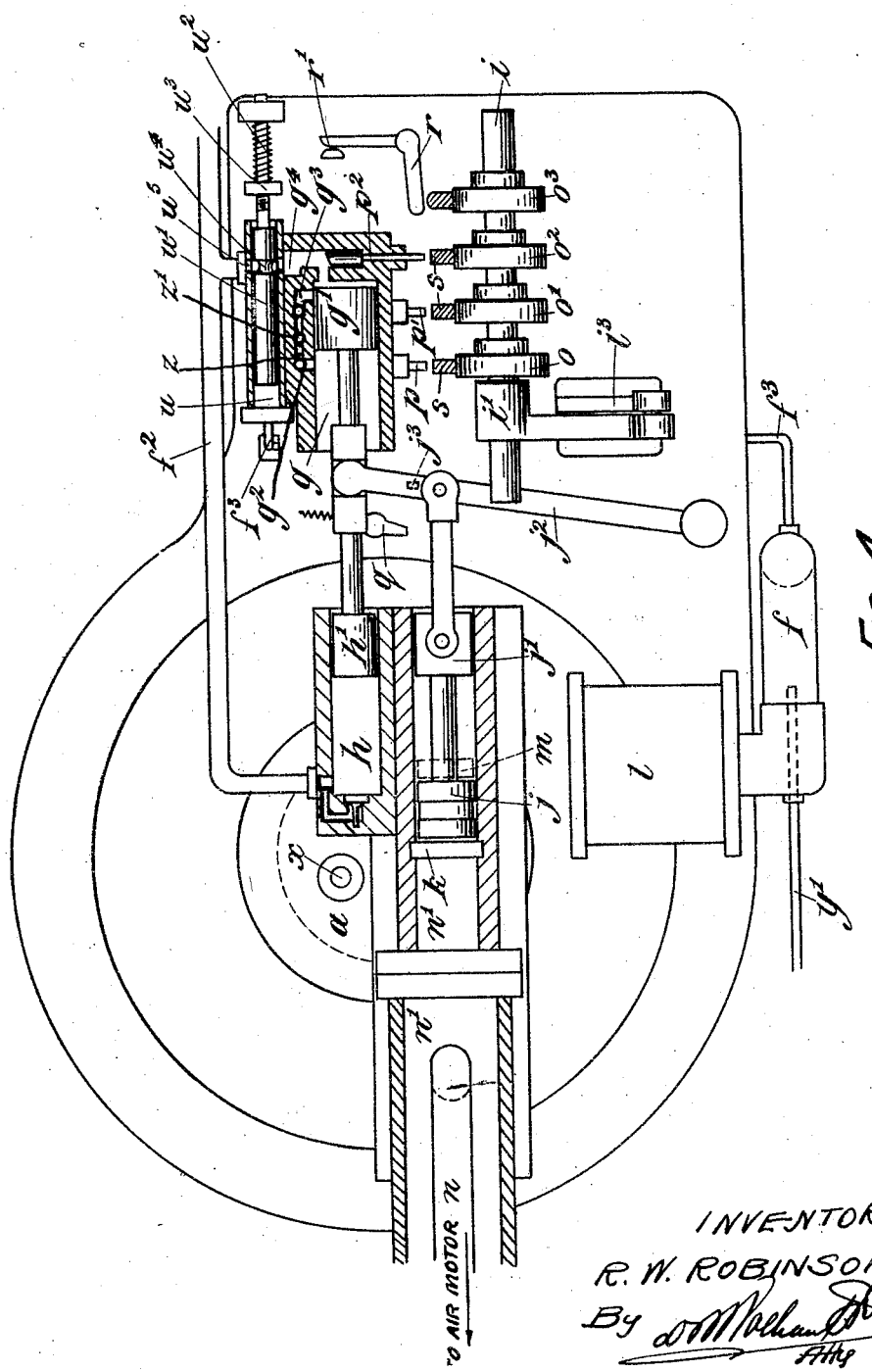
Figure 4 is an end elevation of the combustion chamber and of the device showing one form of means employed for controlling the ignition and exhaust automatically by air pressure from the main reservoir.

In Figures 1, 1ª and 2 and 2ª, the piston $a^1$ of the combustion cylinder $a$ is connected to the crank lever $a^2$ on the rocking shaft $d$, and the piston $b^1$ of the air-compressing cylinder $b$, which is of larger bore than the combustion cylinder and about the same stroke, is connected to a similar crank lever $b^2$ on the same rocking shaft. The crank levers and the connecting rods are in the positions shown at the end of the stroke of the combustion cylinder, the dotted lines representing their positions at the beginning of the stroke. This arrangement gives the piston of the combustion cylinder an increasing mechanical advantage over that of the air-compressing cylinder towards the end of the stroke. In the arrangement shown, the air-compressing cylinder is placed inside the compressed air reservoir $c$, $b^3$ is an air valve for the admission of air to the cylinder $b$, and $b^4$ is an air valve through which the air compressed by the stroke of the piston $b'$ is admitted to the reservoir $c$.

When the inlet port $k$ of the combustion cylinder $a$ opens, the piston $a'$ is driven forward quickly by the admission of compressed air from the reservoir, which passes through the pipe $f$ and the carburetor $l$, where it picks up a charge of petrol or other fuel on its way to the combustion cylinder. The resistance offered to the stroke of the piston $a'$ by the consequent compression of the air in the cylinder $b$ is at first slight, though at the beginning of the stroke the piston $b'$ has a mechanical advantage over the piston $a'$. With the cylinders proportioned and the crank levers set as shown, when the piston $a'$ has reached ⅓ stroke the piston $b'$ will reach a little over ⅔ stroke, producing a pressure of over 30 pounds in the cylinder $b$, and as at this point the piston $a'$ will have only just attained to a slight mechanical advantage over the piston $b'$, the pressure in the cylinder $b$ will equalize a pressure of about 60 pounds in the cylinder $a$, and from that point to the end of the stroke the mechanical advantage of the piston $a'$ over $b'$ increases rapidly. The bore and stroke of the combustion and compression cylinders, and their relative proportions would be regulated by the amount of pressure to be carried in the main reservoir.

When the charge admitted to the combustion cylinder is sufficient, on being ignited, to drive the pistons $a'$ and $b'$ to the end of their stroke, thereby completing the compression of the air in $b$, and forcing it into the reservoir $c$, the inlet port $k$ of the combustion cylinder is closed and the charge fired as will presently be described.

A smaller air reservoir $c'$—Figure 2—surrounds a cylinder $e$ whose piston $e'$ is connected to another crank lever $e^2$ on the rocking shaft $d$, so adjusted that the action of the piston $e'$ is opposed to that of the piston $a'$ and when the exhaust port of the combustion cylinder is opened at the end of the combustion stroke, the pistons $a'$ and $b'$ are driven back through their return stroke by the action of the piston $e'$ which is driven forward by the compressed air in the reservoir $c'$, which is kept at sufficient pressure for the purpose by the reducing valve $v$ through which the reservoir $c'$ is in communication with the main reservoir $c$. The cylinder $e$ exhausts back into the reservoir $c'$, with which it communicates by means of a port or ports $e^3$ which are closed by the piston $e'$ just before it reaches the end of its return stroke, through which it is driven by the next stroke of the combustion cylinder, so that if, through incorrect adjustment of the valve mechanism of the combustion cylinder, the charge admitted should be more than sufficient to compress the air in the compression cylinder into the reservoir, the air cushion thus formed in the cylinder $e$ will take up the surplus power generated.

The crank lever $b^2$ is so set that the normal end of its stroke is on the dead centre as regards the piston $b'$, which, therefore, can never be driven against the end of the cylinder $b'$. The end of the cylinder $e$, where the air cushion is formed, is connected to the reservoir $c'$ by a one-way valve $e^4$, by means of which the pressure in the reservoir quickly starts the stroke. The bore of the cylinder $e$ for a short distance at its outer end is less than that of the rest of the cylinder, the outer end of the piston $e'$ corresponding to this smaller bore, so that at the end of the outward stroke there is also an air cushion formed which checks the stroke before the piston $a'$ reaches the end of the combustion cylinder.

There is another secondary air reservoir $c^2$ supplied from the main reservoir through a second reducing valve $v'$ and the small cylinders which actuate the admission and exhaust mechanism of the combustion cylinder and also the firing of the charge, are worked by air pressure supplied from this reservoir, the reducing valve of which keeps the pressure at a suitable point for this purpose which may be considerably lower than that in the main reservoir. The air is led from the reservoir $c^2$ to the valve mechanism by the pipe $f^2$—Figures 2, 4, 5, 6, and 7.

In Figure 4, the air gauge cylinder $u$ is connected by the small pipe $f^3$ to the pipe $f$ and through that to the main reservoir $c$, and is provided with a long piston $u'$. The amount of air pressure necessary to move this piston forward is regulated by the compression of the spring $u^2$, and adjusted by the nut $u^3$ to that which it is desired to maintain in the main reservoir. The piston $u'$, is provided with an annular groove $u^4$ which, when in the position shown, allows the compressed air from the pipe $f^2$ to enter the valve chamber $g^4$ and through it the cylinder $g$, but when the pressure in the main reservoir rises above the predetermined point the piston $u'$ is driven forward and the groove $u^4$ passes beyond the port $u^5$ connected with the pipe $f^2$, cutting off that pipe from communication with the cylinder $g$. The pipe $f^2$ is always in communication with the cylinder $h$.

The pistons $g'$ and $h'$ are attached to opposite ends of a common piston rod and the area of the piston $g'$ is double that of the piston $h'$. The combustion cylinder $a$ is provided with a common inlet and exhaust port $k$ opening into the cylinder of the piston valve $j, j'$. The inlet and exhaust port $k$ is opened and closed by valves which are conveniently of the piston pattern as shown in Figures 4 and 6. In Figure 4, the pistons $j$ and $j'$ are of the same diameter, but in the alternative construction shown in Figure 6 the piston $j'$ is larger than $j$.

An admission pipe (not shown) from the carburetter $l$ opens into the piston valve cylinder between the pistons $j$ and $j'$ through the port $m$ which is always between the pistons $j$ and $j'$ throughout the length of their stroke. Figure 4 shows the port $k$ open to the exhaust pipe $n'$. The piston valve $j$, $j'$ is actuated by the pistons $g'$ and $h'$ through the connecting lever $j^2$ and it stands in the position shown in Figure 4 as long as the pipe $f^2$ is cut off from the valve chamber $g^4$.

When the pressure in the main reservoir falls enough to cause the gauge piston $u'$ to admit air from the pipe $f^2$ to the cylinder $g$, the piston $g'$ is immediately driven through its full stroke and the piston valve $j, j'$ is consequently driven through its full stroke thereby bringing the port $k$ between the pistons $j$ and $j'$ and admitting the compressed fuel charge from the carburetter to the combustion cylinder, the piston $a'$ of which, Figures 1 and 2, is thus driven forward. The consequent motion of the rocking shaft $d$, Figures 1 and 2, is communicated to the valve rocking shaft $i$, Figures 4 and 5, through the crank lever $l^2$ Figure 2 and the connecting rod $i^3$ and thus to the cams $o, o', o^2,$ and $o^3$, Figures 4 and 5. The position of these cams and of the lever $i'$ at the beginning of the stroke of the combustion cylinder are shown in Figure 8, the dotted lines representing their positions at the end of the stroke. Immediately after the start of the stroke of the combustion cylinder the admission port of the cylinder $g$ is closed by the valve $p^2$ through the motion of the cam $o^2$ and the lever $s$ and the cam $o$ is so timed that it opens the exhaust valve $g^2$ of the cylinder $g$ when the correct charge has been admitted to the combustion cylinder, causing the piston valve, driven by the piston $h'$ to close the admission port $k$. The piston valve is brought to rest at its half stroke by the cushion of air in the cylinder $g$ after the piston $g'$ passes the exhaust port $g^2$, at which point the piston $j$ covers the port $k$, as shown in Figure 6, in which this part of the piston valve is the same as in Figure 4, and the stud $j^3$ on the lever $j^2$ trips the pawl $q$, thereby closing the ignition circuit, and the charge is fired.

At or near the end of the stroke of the combustion cylinder the second exhaust port $g^3$ of the cylinder $g$ is opened by the cam $o^1$, allowing the piston $h^1$ to complete its stroke and thus open the exhaust port $k$, when the pistons $a^1$ and $b^1$, Figures 1 and 2, are driven through their return stroke by the action of the piston $e^1$, as already described. At the end of this return stroke the admission valve $p^2$ is allowed to open the admission port of the cylinder $g$ under the pressure of the air above it by the cam $o^2$ releasing the lever $s$, (this valve may work against a spring above it if thought necessary). If, at this point, the position of the gauge piston $u^1$ allows air from the pipe $f^2$ to enter the cylinder $g$ the cycle will be repeated, but if the pressure in the main reservoir has been sufficiently raised to force the piston $u^1$ beyond the port $u^5$ of the pipe $f^2$, the internal combustion part of the machine will rest till this port is again opened by the falling of pressure in the main reservoir. When the engine is running at a constant speed below its maximum out-put the gauge piston $u^1$ will keep the port $u^5$ partly open and the pistons $g^1$ and $h^1$ will make a slower stroke, but when the inlet port $k$ is opened the stroke of the piston in the combustion cylinder and that of the pistons $g^1$ and $h^1$ will always be at their maximum speed. The cams $o, o^1, o^2, o^3$ are set on the rocking shaft $i$ at about their correct advance and the exact adjustment of the timing of the valves $p, p^1, p^2$ and the lever $r$ can then be made while the engine is running by means of the slides $t$, which are then locked in correct position by the thumbscrews $t^1$.

The cam $o^3$ is so set that it will cause the lever $r$, Figures 4 and 5, to break the ignition circuit at $r^1$ immediately after the contact is made at $q$, so that if, through the sticking of a piston or in any other way, the inlet port $k$ should be prevented from closing at the correct time and too large a charge should therefore enter the combustion cylinder, ignition will not take place on the closing of the circuit at $q$ and the charge will not be fired, but will pass out through the exhaust by the automatic working of the arrangement about to be described.

A small passage $z$—Figure 4—connects the chamber of the exhaust port $g^2$ with that of $g^3$, this passage being throttled by a thumbscrew valve $z^1$, Figures 4, 5 and 7. When the piston $g^1$ is brought to rest at half stroke by the air remaining in the cylinder $g$ if there should be a misfire, the air in $g$ will exhaust by the passage $z$ through the port $g^2$, allowing the piston $h^1$ to complete its stroke and open the exhaust port $k$ of the combustion cylinder when the cycle will be repeated. The thumbscrew valve $z^1$ is adjusted so that the exhaust through the passage $z$ will not be fast enough to interfere with the normal working of the piston valve.

If the ignition circuit should break down, after a few misfires, the pressure in the main reservoir will fall enough to cause the gauge piston $u^1$ to cut off the connection between the pipe $f^2$ and the valve chamber $g^4$ by moving the annular groove $u^4$ in the reverse direction from its normal motion when closing the port, and thus stop the engine with only a slight fall of pressure in the main reservoir, allowing the engine to be started again, when the ignition circuit has been adjusted by pressing the nut $u^3$ against its spring.

The exhaust port $g^3$ of the cylinder $g$ and the port connecting the pipe $f^2$ with the cylinder $h$ are set a little out from the cylinder ends so that the pistons are brought to rest on air cushions at the end of their strokes, and the end of the cylinder $h$ is connected with the pipe $f^2$ by a one-way valve to ensure the quick starting of its stroke. The sparking plug $x$, Figures 4 and 6, is inserted in the end of the combustion cylinder above the piston valve.

The top of the fuel tank $y$, Figure 1, is connected to the air pipe $f$ by a small pipe $y^1$, thus equalizing the pressure between tank and carburetter; this pipe extends a short distance inside the pipe $f$, Figures 4 and 6, its open end meeting the flow of air on its way to the carburetter, so that when the air charge passes through the carburetter, there is no fall of pressure in the tank.

The pipe $f^1$, Figures 2 and $2^a$, leads the compressed air from the main reservoir $c$ to the jacket of the combustion cylinder $a$, where it circulates round the spaces between the fins $a^3$, passing from one space to the next through the apertures $a^4$, Figure 3, in the fins; the aperture in each fin being on the opposite side of the cylinder from those in the fins on either side of it. The compressed air having thus taken up the heat from the cylinder walls, passes out of the other end of the jacket through the pipe $n$, which is carried down the inside of the exhaust pipe $n^1$ to the cylinders of the air motor, these cylinders being also fitted with jackets through which the exhaust gases pass, keeping them at a high enough temperature to be worked by the superheated compressed air to the best advantage.

The pipe $f^1$, Figures 2 and $2^a$, extends into the main reservoir $c$ and is closed at the end, the compressed air passing into it through transverse slots in its sides. Round the end of this pipe is a cylinder $w$ fitted with corresponding slots and having a short sliding motion on the pipe $f^1$. The cylinder $w$ is attached to the piston $w^1$ of the gauge cylinder $w^2$ which is connected with the main reservoir by a one-way valve $w^3$ and is provided with a small relief cock $w^4$. A quick opening and closing of the relief cock, when the pressure in the reservoir is at its maximum, will cause the piston $w^1$ to draw the cylinder $w$ to the end of its possible motion, in which position the slots in the cylinder register with those in the pipe and the air pressure in the air cylinder $w^2$ stands a little below that in the reservoir by the amount necessary to open the valve $w^3$, which should be more than the rise in pressure produced in the main reservoir by one stroke of the combustion cylinder.

Now, if the air motor is run at a speed beyond the capacity of the internal combustion part of the machine, the pressure in the main reservoir will fall, but when it falls below that in the gauge cylinder $w^2$ its piston $w^1$ will move forward so as to equalize the pressure on each side of it and will move the slots in the cylinder $w$ out of register with those in the pipe $f^1$ and throttle the flow of compressed air to the air motor, and it will thus automatically prevent more air being used by the motor than the internal combustion part can supply. The amount of the motion of the piston $w^1$ for a given fall of pressure will depend on the volume of air in the cylinder $w^2$, which is adjusted so that the pressure in the main reservoir will not fall low enough to permit the gauge cylinder $u$, Figure 4, to cut off the pipe $f^2$ from the cylinder $g$.

The pipe $f^1$ is provided with a throttle by which the air motor is started and its speed controlled, and the pipe $f$ is provided with a stop cock which can be closed when the engine is stopped for any length of time; this stop cock is placed between the small pipes $f^3$ and $y^1$ and the main reservoir. A stop cock is also placed in the pipe $f^2$.

Figures 6 and 7 represent an alternative construction to that shown in Figures 4 and 5 and described above. In Figure 6, the piston $j^1$ of the piston valve is of larger diameter than the piston $j$ and is driven towards its end of the piston valve cylinder by the pressure of its charge. It is driven in the opposite direction by compressed air admitted to the cylinder through the valve chamber $g^4$ from the pipe $f^2$ in the same manner as it is admitted to the cylinder $g$, Figure 4. The inner end of this piston corresponds to the bore of the smaller end of the piston valve cylinder, thus providing an air cushion to check the stroke in that direction, the air cushion at the other end being arranged for as in the cylinder $g$, Figure 4. The length of the piston $j^1$ is such that its inner end will not uncover the port $g^2$. The working of the valves $p$, $p^1$, $p^2$ and of the circuit breaker $r$ by the cams $o$, $o^1$, $o^2$ and $o^3$ is the same as described for Figures 4 and 5. The stud $j^3$ Figure 4, is replaced in Figure 6 by a disc attached to the end of the rod of the piston valve which passes through a stuffing box in the end of the valve cylinder, the disc $j^{3\prime}$ tripping the pawl $q$.

In Figures 6 and 7 the make and break of the ignition circuit can take place as shown, the circuit being closed by the contact between the levers $q^1$ and $r^1$, or it may be arranged by two contacts as in Figure 4, or in any other suitable manner. In this construction there is a small port connecting the valve chamber $g^4$ with the gauge cylinder $u$ and so placed that the groove $u^4$ will connect these two ports after it has closed the port $u^5$ to the pipe $f^2$ so that if the engine should be stopped for any length of time with the stop cock in the pipe $f$ standing open and some of the charge should leak past the piston $j^1$, the leakage will escape by these small ports and thus be prevented from moving the piston valve.

Figures 6 and 7 show the positions of the piston valve and air valves at the moment of ignition, when the piston $j$ covers the port $k$.

In both designs there is an annular depression around the centre of the piston $j$, which depression stands opposite the port $k$ when the charge is fired, so that the part of this piston exposed to the heat of the explosion does not come into contact with the walls of the piston valve cylinder.

The valve $w^3$, Figure 2, and the relief cock $w^4$ of the gauge cylinder $w^2$ may be replaced by a coil spring similar to that of the gauge cylinder $u$, Figure 4, and adjusted in the same manner to the correct pressure to correspond to that carried in the main reservoir, but the arrangement described above would need less attention as it automatically adjusts the pressure in the cylinder to that in the reservoir.

I claim:—

1. A combined internal combustion engine and air compressor including oppositely located internal combustion and air compressor units, a rock shaft common to said units, a main compressed air reservoir in communication with the air compressor, an auxiliary reservoir, an auxiliary piston adapted to be actuated by pressure supplied from said auxiliary reservoir to return the pistons of the internal combustion engine and air compressor to their outward position after their working strokes, a source of fuel supply for the internal combustion engine unit, an air line between the main compressed air reservoir and the internal combustion engine, said air line communicating with the said source of fuel supply and means controlled by the drop of pressure in the main reservoir for supplying a fuel charge to the internal combustion engine unit and igniting the same.

2. An apparatus of the class described including an internal combustion engine and an air compressor having a main air storage reservoir, a rock shaft, cranks on said rock shaft respectively connecting with pistons of the internal combustion engine and air compressor, an auxiliary reservoir communicating with the main reservoir, piston and cylinder means operatively connected with the rock shaft and with the auxiliary reservoir for returning the pistons of the engine and the compressor to the beginning of the working strokes, and means also operated by said crank shaft for controlling the valves of the internal combustion engine.

3. An apparatus of the class described including an internal combustion engine having a jacket provided with a circuitous passageway, an air compressor including a main reservoir, an auxiliary reservoir in connection with the main reservoir, reciprocating pistons respectively for the internal combustion engine and air compressor, and piston and cylinder means operated by the air pressure in the auxiliary cylinder for operating said pistons of the engine and compressor on the return stroke, and a conduit from the main reservoir to the casing of the internal combustion engine whereby the compressed air absorbs heat from the engine.

4. An apparatus of the class described including a jacketed internal combustion engine, an air compressor having a main air storage reservoir, a compressed air conduit connecting the main reservoir with the jacket of the internal combustion engine, and an automatic regulator device for controlling the supply of air from the main reservoir to the said conduit whereby air will not be permitted to escape from the main reservoir faster than the internal combustion engine can compress and supply it.

5. An apparatus of the class described including a jacketed internal combustion engine, an air compressor having a main air storage reservoir, a compressed air conduit connecting the main reservoir with the jacket of the internal combustion engine, and an automatic regulator device for controlling the supply of air from the main reservoir to the said conduit whereby air will not be permitted to escape from the main reservoir faster than the internal combustion engine can compress and supply it, said automatic regulator comprising a sleeve having openings and adapted to register with openings in a complemental member which communicates with the conduit leading to the jacket of the cylinder, a cylinder in valved communication with the main reservoir, a piston in said cylinder and connected with said sleeve, and an atmospheric valve communicating with said cylinder.

6. An apparatus of the class described including an internal combustion engine, and an air compressor device, said device comprising a main compression cylinder and a main storage reservoir, piston and cylinder means for returning the pistons of the engine and compressor to the beginning of their working strokes, an auxiliary reservoir communicating with the main reservoir and adapted to supply air to the said piston and cylinder means, a low pressure reservoir also in communication with the main air storage reservoir, valve means for the internal combustion engine, and means including the pipe-line in communication with the low pressure reservoir for operating said valve means, a carbureter for the internal combustion engine, a conduit between the carbureter and the main air storage reservoir, a fuel tank for the carbureter, and an air pressure line between the conduit connecting with the main reservoir and the said fuel tank.

In testimony whereof I have affixed my signature hereto this 6th day of September, 1920.

ROCHFORT WYBRANTS ROBINSON.